US010097953B1

(12) United States Patent
Hartman et al.

(10) Patent No.: US 10,097,953 B1
(45) Date of Patent: Oct. 9, 2018

(54) NETWORK BASED RESOURCE MANAGEMENT AND ALLOCATION

(71) Applicant: United States Automobile Association (USAA), San Antonio, TX (US)

(72) Inventors: Wayne Hartman, San Antonio, TX (US); Nathan Mahoney, Boerne, TX (US); Hoang Trung Vo, San Antonio, TX (US); Joshua Samuel Leonard, San Antonio, TX (US); Michal Leighton Van Cleave, Helotes, TX (US); Jeffrey Young, Helotes, TX (US); Luke James Gradeless, San Antonio, TX (US); Brandon K. Esplin, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/180,992

(22) Filed: Jun. 13, 2016

Related U.S. Application Data

(60) Provisional application No. 62/175,260, filed on Jun. 13, 2015.

(51) Int. Cl.
  *H04W 4/02* (2018.01)
  *H04W 4/021* (2018.01)
  *G06Q 20/32* (2012.01)
  *G06Q 40/00* (2012.01)

(52) U.S. Cl.
  CPC ........ *H04W 4/021* (2013.01); *G06Q 20/3224* (2013.01); *G06Q 40/12* (2013.12)

(58) Field of Classification Search
  CPC .................................. H04W 4/021; H04W 4/04
  USPC .................. 455/456.1-3, 406-408, 414.1-2
  See application file for complete search history.

(56) References Cited

U.S. PATENT DOCUMENTS

| | | | |
|---|---|---|---|
| 8,538,827 B1 * | 9/2013 | Dryer | G06Q 30/00 705/26.1 |
| 2007/0021102 A1 * | 1/2007 | Sherman | H04L 12/14 455/408 |
| 2009/0164328 A1 * | 6/2009 | Bishop | G06Q 20/02 705/19 |
| 2012/0143759 A1 * | 6/2012 | Ritorto, Jr. | G06Q 20/02 705/44 |
| 2015/0100443 A1 * | 4/2015 | Van Heerden | G06Q 20/227 705/16 |
| 2015/0161585 A1 * | 6/2015 | Huster | G06Q 20/3224 705/44 |
| 2015/0161586 A1 * | 6/2015 | Bailey | G06Q 20/3224 705/44 |
| 2015/0228153 A1 * | 8/2015 | Hedrick | G07F 17/3225 463/25 |
| 2015/0294280 A1 * | 10/2015 | Wesson | G06Q 40/02 705/39 |
| 2016/0063484 A1 * | 3/2016 | Carpenter | G06Q 20/354 705/41 |
| 2016/0314487 A1 * | 10/2016 | Martin | G06Q 30/0215 |

\* cited by examiner

*Primary Examiner* — Cong Tran
(74) *Attorney, Agent, or Firm* — Baker Hostetler LLP

(57) ABSTRACT

An electronic system provides various features and functionality for managing resources. An alert may be sent when a mobile device crosses a geo-fence. The alert may describe how much of the resource is available for the types of transaction that are likely to occur within the geo-fence. The alert may request or confirm the allocation of the transaction to a resource pool or suggest alternative transactions.

20 Claims, 4 Drawing Sheets

US 10,097,953 B1

NETWORK BASED RESOURCE MANAGEMENT AND ALLOCATION

RELATED APPLICATIONS

This application claims the benefit of U.S. Provisional Patent Application No. 62/175,260, entitled "Network Based Resource Management and Allocation," filed Jun. 13, 2015. The contents of U.S. Provisional Patent Application No. 62/175,260 are incorporated by reference herein in its entirety.

BACKGROUND OF THE INVENTION

Despite the continued importance of managing personal resources (e.g., battery power, memory, etc.), there is yet to be developed an effective system of leveraging electronic capabilities to assist with multiple aspects of managing resources.

SUMMARY OF THE INVENTION

Described herein are one or more examples that include an electronic system that provides various features and functionality for managing personal resources (e.g., battery power, memory, or money). For example, an alert may be sent when a mobile device crosses a geo-fence. The alert may describe how much of the resource is available for the types of transaction that are likely to occur within the geo-fence. The alert may request or confirm the allocation of the transaction to a resource pool or suggest alternative transactions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF CERTAIN EXAMPLES

Figure 1:
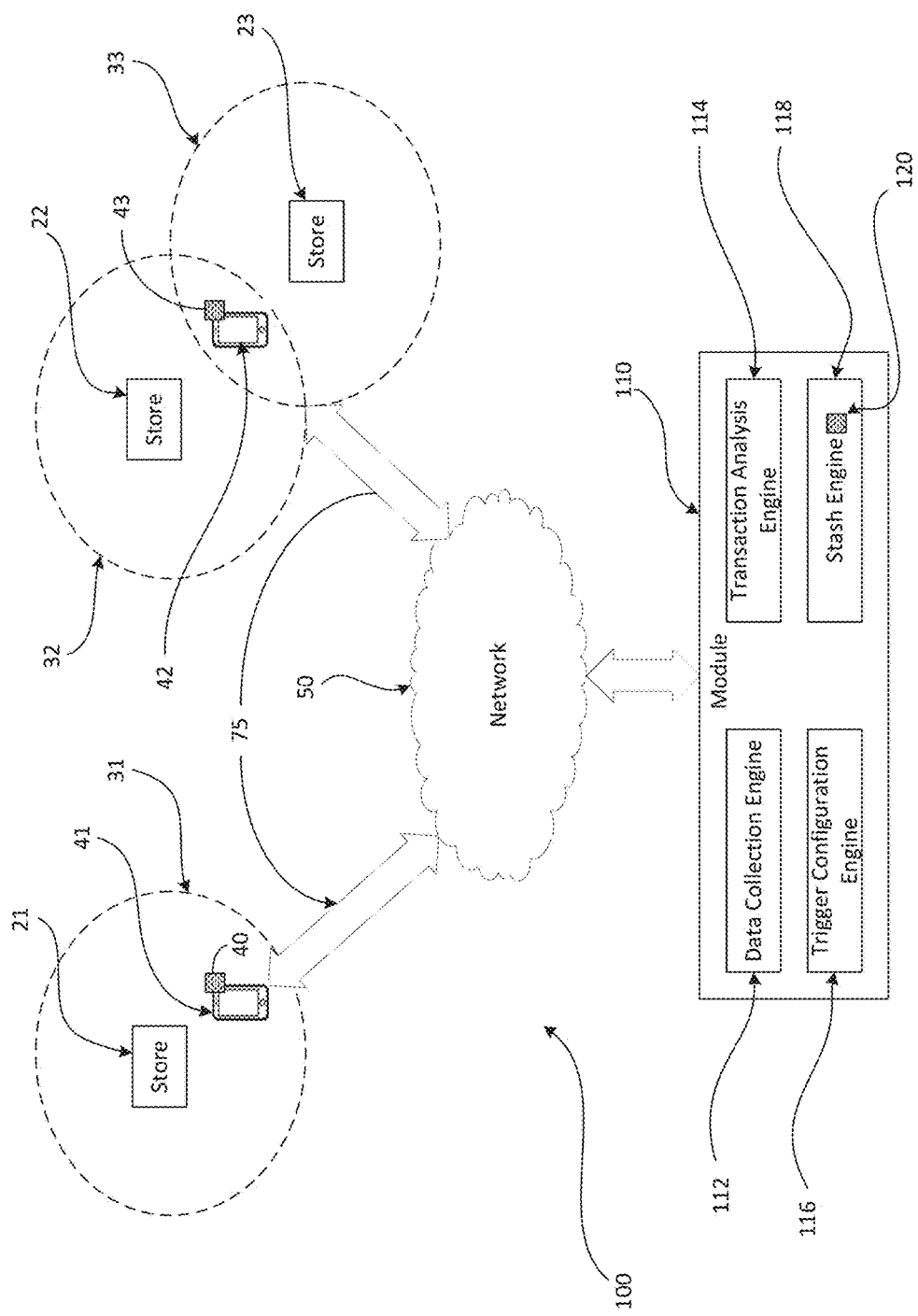
FIG. 1 depicts an exemplary system for using network based resource management and allocation described herein.

FIG. 1 illustrates an exemplary system that may be utilized to practice network based resource management and allocation, as described herein. FIG. 1 includes management module 110, network 50, communications 75, stores (e.g., store 21, store 22, or store 23), geo-fences (e.g., geo fence 31, geo fence 32, or geo fence 33), and devices (e.g., mobile device 41 or mobile device 42). Also, in this example, module 110 includes data collection engine 112, transaction analysis engine 114, trigger configuration engine 116, stash engine 118, and stash 120.

Figure 2:
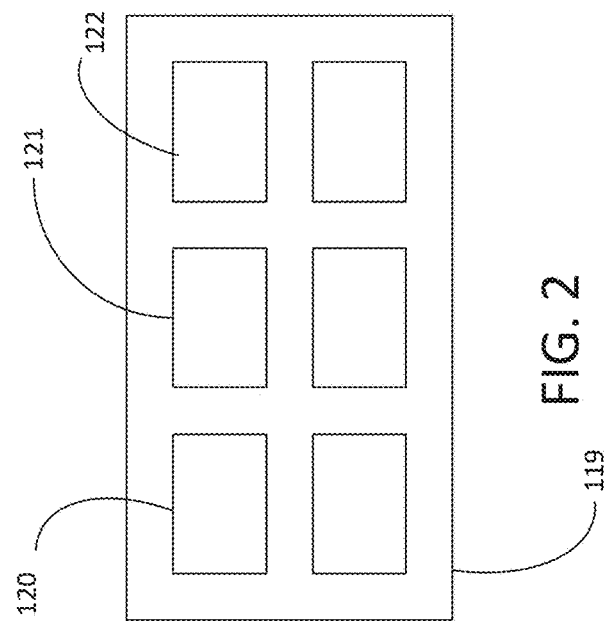
FIG. 2 illustrates an exemplary resource allocation.

Generally, a stash may be considered an allocation of a resource. FIG. 2 illustrates exemplary resource that comprises a plurality of stashes. Block 119 is an exemplary resource (hereinafter resource 119). Resource 119 may be any appropriate resource, such as electrical, memory, fuel for a vehicle (e.g., gasoline), or money. Different stashes, such as stash 120, stash 121, or stash 122, may reserve the same or different amounts of resource 119. In a first scenario, resource 119 may be associated with bandwidth usage of a data connection of mobile device 41 or an associated user profile 40. Stash 120 may be designated "entertainment" with a desired 50 megabytes limit for a 30 day period, stash 121 may be designated "work" with a desired 100 megabytes limit for a 30 day period, and stash 122 may be designated "continued education" with a desired 50 megabytes limit for a 30 day period. In this first scenario, the bandwidth usage of a football game application used on mobile device 41 may be attributed to the entertainment stash (e.g., stash 120), while the bandwidth usage of an electronic mail application (or e-mail account within the e-mail application) may be attributed to the work stash (e.g., stash 121). In a second scenario, resource 119 may be associated with use of funds linked to user profile 40. Stash 120 may be "entertainment" ($500), stash 121 may be "clothes" ($200), and stash 122 may be "groceries" ($300). For example, the purchase of a football game application linked to user profile 40 may be attributed to the entertainment stash (e.g., stash 120), while the purchase of a hat linked to user profile 40 may be attributed to the clothes stash (e.g., stash 121). Stashes, as discussed herein, may be rigidly separated logical or physical entities (e.g., partitioned memory, separate physical hardware memory, or separate bank accounts).

Referring further to FIG. 1, it is to be appreciated that network 50 depicted in FIG. 1 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, the system 100 is connected with the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Communication links 75 may comprise either wired or wireless links. It is to be appreciated that the illustrated network connections of FIG. 1 are exemplary and other means of establishing a communications link between multiple devices may be used.

Still referring to FIG. 1, data collection engine 112 may be utilized to receive and store information relating to transactions (e.g., use of software applications or purchases of products) that may be linked with user profile 40 which is associated with mobile device 41. Transactions, as discussed herein, are generally associated with a resource. In a first example, if the resource is power (e.g., battery life of mobile device 41), memory, or bandwidth, the transaction may be a use of an application (e.g., a mapping application or video streaming application) that affects those resources. In a second example, if the resource is financial in nature (e.g., funds in an account) the transaction may be a purchase that affects that financial resource.

Transaction analysis engine 114 may be utilized to analyze transactions associated with user profile 40. For example, transaction analysis engine 114 may analyze previous purchases linked to user profile 40 in order to determine that certain purchases (e.g., shoes) or purchase(s) at certain locations (e.g., store 21, store 22, or store 23) have a history of being associated with certain stashes (e.g., stash 120). In another example, similar user profiles to a specific user profile (e.g., user profile 40) may be identified based on threshold levels of similarity of characteristics of the "similar user profiles" and user profile 40. For example, characteristics may include age, gender, presence of applications on mobile device 41, use of applications of mobile device 41, device specifications (e.g., presence or performance of hardware), previous purchases, previous creation of stashes, previous modification of stashes, family profile (e.g., single, married, number of kids), residence situation (e.g., own, rent, address), income level, or interests (e.g., sport or running), among other things. Then, based on a threshold level associated with similarity of user profiles, for example, stashes may automatically be generated for user profile 40 (e.g., during initial setup or a periodic update that creates a new stash) or automatically ascribe a specific purchase to stash 120 (e.g., based on how similar user profiles labeled the same transaction). Given that a plurality of characteristics may be considered when identifying whether user profiles are similar, it is contemplated herein that each of the user profiles may have a similarity score associated with them (e.g., based on how similar user profile 40 is to user profile 43). Thus, similar user profiles may have a weighted contribution to a possible suggested mapping (e.g., user profiles that are more similar to user profile 40 may more heavily influence what suggestion or automatic mapping is ascribed for a transaction conducted by user profile 40).

Still referring to FIG. 1, trigger configuration engine 116 may be utilized to (automatically) analyze transactions or events to identify triggers that may be configured or generated for user profile 40. For example, when a device or person associated with user profile 40 enters into geo-fence 31 of store 21 (e.g., the vicinity of an ice cream store), there may be a particular transaction linked with user profile 40 occurs (e.g., use of e-mail application, use of video streaming, or purchase of ice cream). In this example, the transaction may be allocated to stash 120, which may be designated any appropriate category, such as "work" (e.g., e-mail application), "entertainment" (e.g., video streaming application), "discretionary" (e.g., purchase of ice scream), or the like, based on the resource and transaction. Thus, for user profile 40, a trigger may be generated for when a person or device associated with user profile 40 has moved within a threshold distance and direction of first store 21 (e.g., by entering into geo-fence 31). Mobile device 41, which is associated with user profile 40 in this example, may be sent specific information in response to the generated trigger, such as the remaining level of resources in stash 120 (e.g., level of bandwidth resource, battery power resource, or funding resource). It is contemplated herein that a person may be determined to be within geo-fence 31 based on recognition of a location of a device associated with the person (e.g., mobile device 41), by facial recognition, recognition of movement, or the like. Stash engine 118 may be utilized to generate stashes or manage resource allocation (e.g., energy, bandwidth, memory, or funding) between various stashes, among other things. Stash engine 118 may include stash 120, among others. Data collection engine 112, transaction analysis engine 114, trigger configuration engine 116, stash engine 118, and stash 120 are logical entities in which their functions maybe appropriately distributed or combined over one or more devices.

In an example, a software application executes on mobile device 41 (e.g., smart phone or electronic wearable) associated with user profile 40, which includes a display that shows an amount of an unallocated resource (e.g., energy, bandwidth, memory, money). In an example, if, between the one or more memory accounts available to user profile 40 (e.g., cloud storage or local storage) the user has 4000 megabytes, and the pre-allocated uses (e.g., "work" or "continuing education") account for 3200 megabytes, then the amount left would be 800 megabytes, which may be displayed (e.g., "What's left: 800 megabytes"). In another example, if, between the one or more financial accounts available to the user (e.g., checking account, savings account) the user has $4,000, and the pre-allocated expenditures (e.g., stashes) account for $3,200, then the amount left would be $800, which may be displayed to the user (e.g., "What's left: $800").

The user may further configure the stash(es) 120 to replenish themselves when resources become available. In an example with regard to battery power, there may be instructions for module 110 that every time mobile device 41 is plugged in to an external power source, one or more stashes get replenished. It is contemplated herein that the replenishment may be by a fixed amount (e.g., 5 minutes or 'X' milliamp-hours) or a percentage amount (e.g., 3% of the power added). In another example with regard to money, there may be configuration that every pay day linked to user profile 40 (or maybe every other payday (e.g., only on pay days not near the end of the month when rent is due)), certain stashes get replenished. It is contemplated herein that the replenishment may be by a fixed amount (e.g., $50.00) or a percentage amount (e.g., 3% of the funds added to one or more of the accounts linked to user profile 40). The replenishment of stash 120 may just be a topping off (e.g., only spent $75 of $100 so only $75 needs to be replenished not adding another $100 to stash 120).

Additional functions of module 110 are discussed below. Stash engine 118 may create stashes when transactions are reoccurring. In an example, if there is a reoccurring bill each month, the system will detect that and over time prorate the amount of the bill to move money into a desired stash 120. So by the time the bill comes due, the proper amount of money would be set aside in stash 120. Expanding on this example, there may be an internet bill of $70 that occurs every month, while a user gets paid bi-weekly. Stash engine 118 would make sure to set aside $35 for each pay period. In a financial context, stash engine 118 may adjust stashes to assist in financial performance. For example, stash engine may adjust increase funds to a first credit card (e.g., stash 120) which as a higher interest rate than a second credit card (e.g., stash 121).

Data collection engine may allow for a change of default names of transactions. The name change will be applied to subsequent identifiers (e.g., CoffeeShop1234=CoffeeShop) for transactions. This allows for easier review of transactions.

Figure 3:
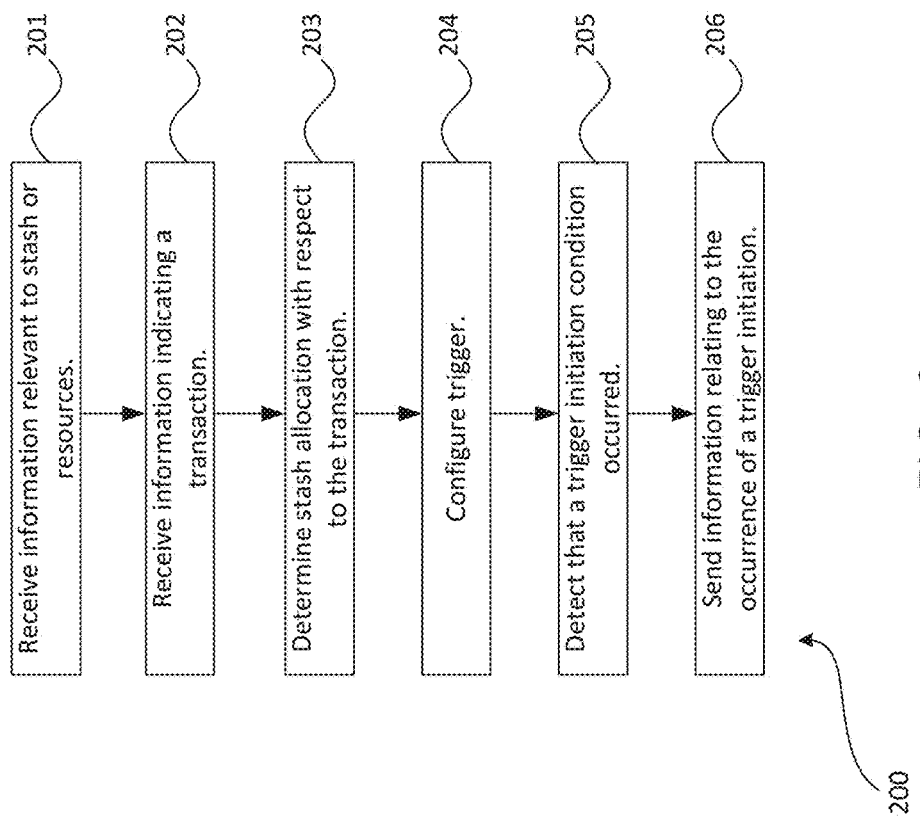
FIG. 3 illustrates an exemplary flowchart depicting an operation of the system of FIG. 1.

Referring to FIG. 3, exemplary operation of a process 200 associated with network based resource management and allocation is discussed below. At step 201, configuration information relevant to a stash 120 is received. For example, information linked to user profile 40 may be supplied in order to identify how resources (e.g., energy, memory, bandwidth, or money) are to be allocated among stash 120, stash 121, and stash 122. The configuration information of step 201 may include location information of mobile device 41, creating additional stashes, updating stashes, deleting stashes. The configuration information may be based on similar user profiles (e.g., user profile 43). Step 201 may be considered an initialization or setup step and may be particularly relevant for new users of the network based resource management and allocation system.

At step 202, information (e.g., a notification) associated with a transaction linked to user profile 40 or other action linked to user profile 40 is received. The information of step 202 may include a location or movement of mobile device 41, an indication that a transaction occurred, a location of a transaction, an anticipated location of a transaction, or time of transaction, among other things. For example, a notification about a transaction with regard to using an audio book application on mobile device 41 may be received from mobile device 41 or a cloud service that hosts the audio application. In another example, a notification with regard to a purchase of ice cream from an ice cream store via a credit card linked to user profile 40 may be received. The notification may be received from the organization that manages or deals with management of the credit card (e.g., for example, if the credit card company is authorized to share details of the purchase to other entities).

At step 203, stash allocation with respect to the transaction of step 202 is determined. The determination of the stash to attribute the transaction to may be based on a selection from a user (e.g., via mobile device 41), or the identification of the stash to attribute the transaction to may be performed automatically (e.g., transaction analysis engine 114). In an example, a message may be sent to mobile device 41 that requests identification of which stash a transaction should be ascribed to. This request may include one or more suggestions of stashes (e.g., stash 121 or stash 122 after stash 120 is ruled out). In an example, if a transaction occurs, analysis of the transaction along with the previous transactions linked to user profile 40 (or previous transactions associated with similar user profiles) may suggest that the transaction should be subscribed to stash 121 or stash 122. Thus, in this example, mobile device 41 (e.g., a smart phone, a smart wearable (e.g., watch, glasses), etc. . . . ) may display stash 121 or stash 122 in the order that a user is more likely to select between the two, and a third option of "see more stashes." In other words, if it is more likely the user will select stash 121, then that stash (e.g., stash 121) is listed first. It is contemplated herein that the displayed stash(es) may be a list of the names of the stashes, pictures representing the stashes, or a combination thereof.

With continued reference to step 202, it is contemplated herein that, after determining the stash to attribute the transaction to is received and applied, an alert may be sent to mobile device 41 via electronic mail, short message service (SMS) text, or the like (another communication system linked to user profile 40). The alert (also considered a notification herein) may include the stash that the transaction was ascribed to (e.g., stash 121), how much is left in stash 121, or how much longer before the next reloading of stash 121 is (e.g., the next expected connection of mobile device 41 into an external power source or the next expected payday), among other things.

Still referring to step 203, if a transaction is initially identified with a stash that does not have sufficient allocated resources remaining, then a determination of which stash or stashes will cover the shortage is made. The determination may be made based on a response to a request to a user or identified based on analysis of past allocation patterns of user profile 40 or similar profiles (e.g., user profile 43). In another example, the stash to be used may be preconfigured. For example, if a user spends a weekend on vacation, then all transactions over the course of that that time period (e.g., a weekend) may be allocated to stash 120 (e.g., the vacation stash). Stashes may be created for regular bills or a general goal (e.g., vacation) and be setup to spread payments over a period (e.g., 12 months).

At step 204, a trigger may be generated or updated. The analysis of transactions linked to user profile 40 may lead to the generation of a trigger. The analysis may be a consideration of the determination of step 203. Triggers may be constantly refined (e.g., updated) or generated based on past behaviors (e.g., actions and stash allocations).

With continued reference to step 204, trigger function engine 116 may determine that transactions associated with a use of a certain application (or operation within the application) or purchase from a certain store occurs whenever mobile device 41 is within a certain threshold distance, direction, or speed, for example. Thus a trigger may be generated to include a geo-fence (e.g., geo-fence 21) for which to base the trigger.

Although the geo-fences in FIG. 1 are circular and may encompass their respective store or other anchor object (e.g., geo-fence 31 encompasses store 21), it is contemplated herein that the geo-fences may be any shape. Triggers may be based on actions (e.g., movements) by mobile device 41, such as mobile device 41 moving along a certain road or stopping at an intersection. Analysis of past movements of mobile device 41 may be used to ascertain a geo-fence or other trigger supporting actions, which may not rely much or not at all with the distance of performing an action and the anchor point (e.g., store 21, store 22, or store 23).

At step 205, a device has detected that a trigger event (e.g., location, use of an application, purchase of an item, etc. . . . ) has occurred. In one example, this detection may occur via location information for the user being generated via a device of the user's (e.g., GPS on the user's cell phone, whether a device of the user is within WiFi/NFC/other electronic communications range of an area or device).

At step 206, send information relating to the occurrence of a trigger event. For example, if mobile device 41 enters into geo-fence 31, and a trigger exists for geo-fence 31 around store 21 (or stores with a threshold level of similar characteristics as store 21), then a proactive notification may be sent with regard to how much is left in the expected stash (e.g., stash 120) to be utilized (e.g., use of a navigation application or purchase from store 21).

With continued reference to step 206, a proactive notification based on past actions or the like may assist in keeping the actual use of a resource within a desired threshold that is allocated to stash 120. In an example, a trigger may be activated based on geo-fence 31 for store 21, which may be a grocery store. Based on past actions module 110 may generate a list of items that are expected to be purchased. Based on the expected purchase list it may be determined that stash 120 would not have the necessary funds to purchase all the items on the list. In another example, the list of items may be automatically generated or modified with lower cost equivalents or reduction of items to get the desired purchase within amount of the stash (e.g., stash 120). In another example, before purchasing an item, the price of the item may be determined (e.g., scanning using mobile device 41 via barcode or radio-frequency identification (RFID) communication) before purchase. This may allow module 110 to provide an alert of any possible shortfall within stash 120.

Referring still to FIG. 3, it is contemplated herein that when mobile device 42 is within two geo-fences (e.g., geo-fence 32 and geo-fence 33), one alert may be sent with respect to each geo-fence or a single alert may be sent that combines the information that would have been represented by the two or more alerts.

Figure 4:
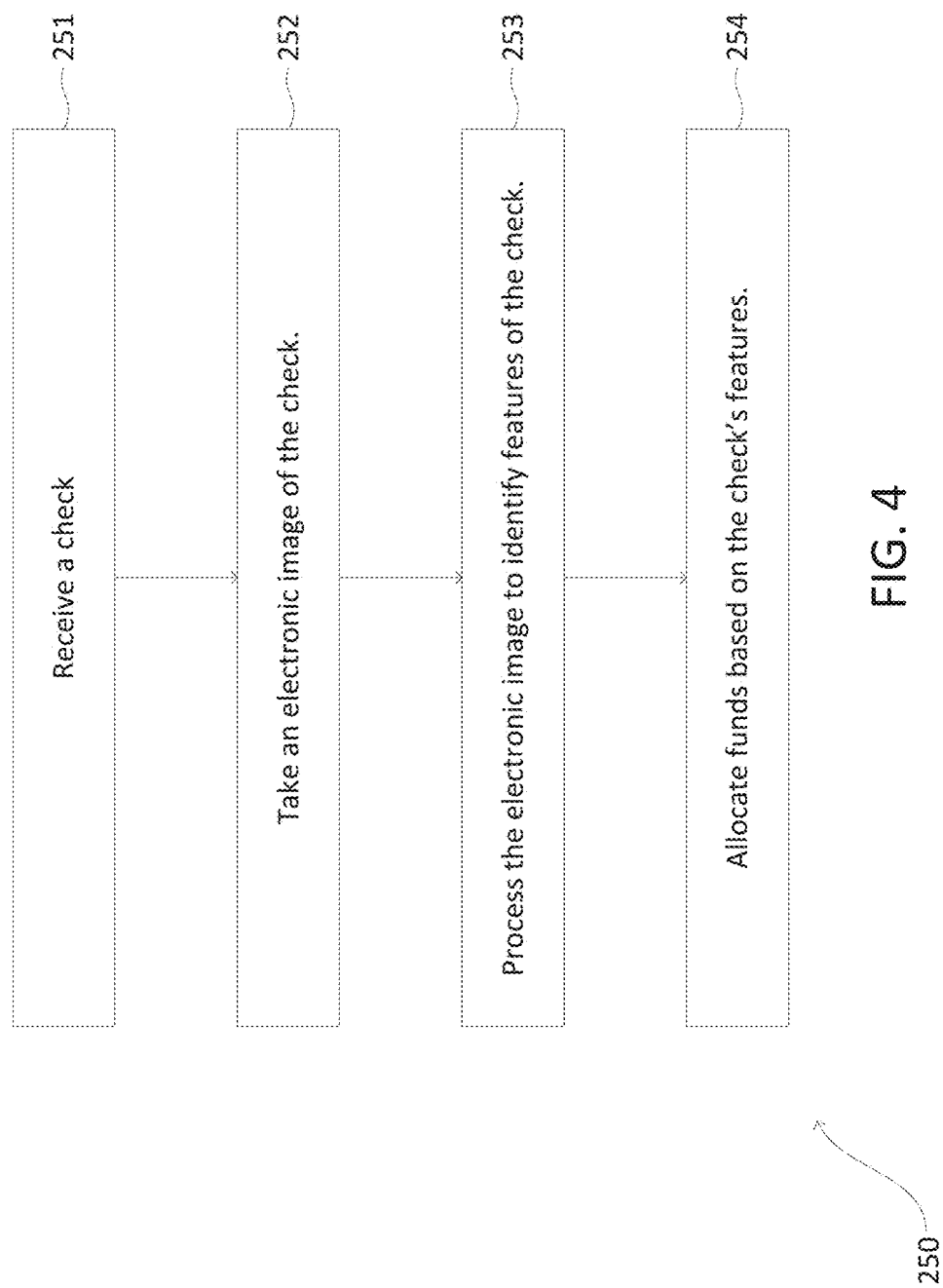
FIG. 4 illustrates an exemplary flowchart depicting another operation of the system of FIG. 1.

Turning now to FIG. 4, FIG. 4 illustrates an exemplary process 250 associated with network based resource management and allocation. At step 251, a check is received by a user. For example, the user may initially fill out a check that is to be sent to someone else. Then, the user takes an electronic image of the check (step 252), and the image is analyzed (step 253). It is contemplated herein that the analysis of the check's image may be performed on the device that captured the image (e.g., mobile device 41) or it may be performed on another device, such as a server or another personal device (e.g., the picture was captured by a wearable but the analysis is performed by a cell phone)). At step 254, funds may be allocated based on the analysis of the check image.

To illustrate this, in one exemplary use case, a user owes someone $200, so they write a check for $200, payable to the payee. The user then captures an image of the check, and the image is analyzed to identify check characteristics such as the amount of the check, the date it was signed, the signature, the memo field, the check number, or any other information that may be gleaned from the check, via visible light or otherwise (e.g., or wavelengths emitted by the check could be collected and analyzed). Then, optionally, the check's amount may be set aside into stash 120. In one example, the amount of the check may be automatically set aside as tentatively credited to stash 120 or a there may be a creation of a new stash 120. Mobile device 41 may display a prompt that requests an indication of which stashes the money should be allocated from. This set-aside may be another stash that is controlled and managed by the user or it may be to a stash controlled by a third party (e.g., a financial entity such as the user's bank). In this way, the funds may be guaranteed similar to how a certified check's funds are guaranteed (e.g., by virtue of the fact that the check's payor no longer has access to manage the funds, and instead the certifying bank has placed the funds in an account that can only be accessed by the certifying bank when the check itself is deposited and cleared).

In another example, after the check's image is analyzed, the payee may be notified that they are about to receive the check. The notification may include an identification of how much the check is for or who the check is from. Optionally, the payee may be provided the ability to electronically accept the check, in which case the payee may immediately accept electronic payment of the check, and optionally the payor may then dispose of the physical check without having sent it (e.g., to the payee, to the payee's bank, to the payor's bank). Optionally, if the funds are certified then the payee may also be notified that the funds are certified.

Although specific nomenclature is used in the above example(s) (e.g., "discretionary spending", "entertainment", and "see more stashes"), such are provided for exemplary purposes only and the breadth of this description and these example(s) is not to be limited to said terminology. It is contemplated herein that a user profile may be associated with one particular device or no particular device, but a particular identifier.

Also, although one or more examples described herein refer to finances (e.g., U.S. dollars), it is contemplated herein that any type of resource may be utilized in coordination with the one or more examples described herein, including, for exemplary purposes only, other versions of physical currency (e.g., Euros), electronic currency (e.g., bitcoins), owed activities (e.g., an obligation to perform some service), or other resources (e.g., power, memory, or bandwidth).

In one example, if a user is traveling by herself, then a certain trigger may not be initiated, whereas if the user is traveling with someone else (e.g., a friend, a child), then a certain trigger may be initiated. Thus, for example, if the user nears an ice cream shop by herself, that trigger may not be initiated, whereas if she is with her child (which may be detected via NFC from electronics of the accompanying person's, the friend's cell's location, Wi-Fi communications detection, MAC address detection of a known electronic device that belongs to a specific person, facial recognition) then the user may be sent a notification of how much ice cream related funds the user has left, in the appropriate stash (e.g., stash 120). Thus, the trigger may include initiation characteristics related to and based in part on whether the user is accompanied by anyone, and by whom.

In another example, the trigger may include initiation characteristics related to the time the analysis is being performed (e.g., when the user crossed or remained in geo-fence 31). In another example, some states (e.g., Texas) allow student supplies to be purchased tax-free on one or more days—thus, the user may have one or more triggers that alert the user, such as when they cross a geo-fence related to a store that sells school supplies, as to the fact that they may make these purchases tax free that day/time.

In another example, if the user has not eaten for a while (this determination may be based on analysis of the user's biometrics measured by mobile device 41 or based on recent purchase history), then a trigger may be sent such that, if the user associated with user profile 40 is expected to be hungry and they enter geo-fence 31 of a food distribution place (e.g., supermarket, restaurant, convenience store), the user may be sent an alert along the lines of "you are likely hungry—this is you helpfully reminding you to be careful about what food you buy now."

It is contemplated herein that a plurality of electronic devices associated with a user profile 40 may act in coordination. For example, mobile device 41 and the user's smart watch may coordinate communications and display of information. It is also contemplated that user profile 40 may be associated with more than one person (e.g., a family). In an example, the movements or other actions (or projected actions) of different family members, may be taken into account in generating triggers and ascribing transactions to stashes.

Figure 5:
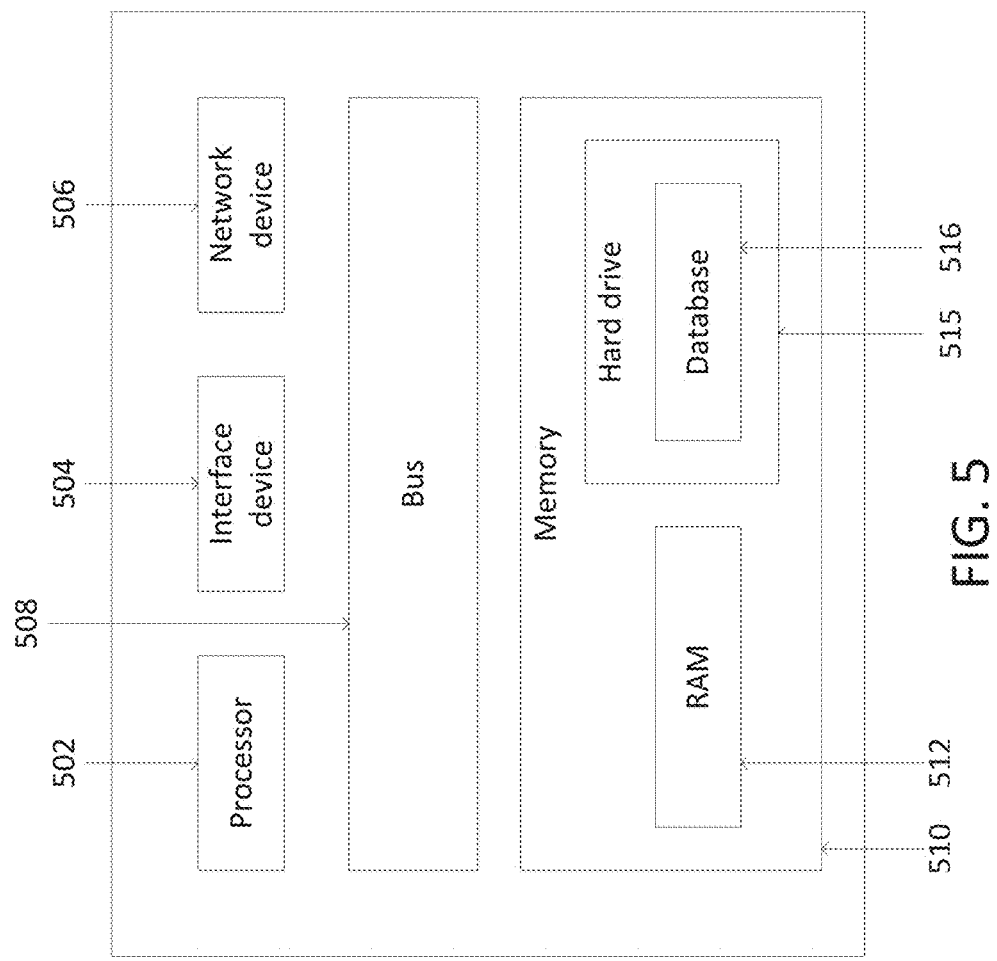
FIG. 5 illustrates an exemplary computing device that may be used in coordination with network based resource management and allocation as described herein.

Referring to FIG. 5, illustrated is an exemplary computing device as might be used when utilizing the systems and methods of network based resource management and allocation described herein. In one example, computing device 500 includes memory 510, a processor 502, an interface device 504 (e.g., mouse, keyboard, monitor), a network device 506. Memory 510 or any storage medium as discussed herein should not be construed as a signal. Examples of memory 510 may comprise a recordable data storage medium, such as a magnetic, optical, biological, or atomic data storage medium. In one example, memory 510 includes a series of computer instructions written in or implemented with any of a number of programming languages, as will be appreciated by those skilled in the art.

Memory 510 in one example includes RAM 512, hard drive 515, which may include database 516. Database 516 in one example holds information, such as information that relates to users or parties interacting with system 100.

The terms "engine" and "module" denote a functional operation that may be a stand-alone component or an integrated configuration of a plurality of subordinate components. Thus, engines and modules may be implemented as a single engine/module or as a plurality of engine/modules that operate in cooperation with one another. Moreover, engines/modules may be implemented as software instructions in memory 510 or separately in any of hardware (e.g., electronic circuitry such as mobile device 41), firmware, software, or a combination thereof. In one example, engines/modules contain instructions for controlling processor 502 to execute the methods described herein. Examples of these methods are explained in further detail in the exemplary examples herein.

Steps associated with the processes described herein can be performed in any order, unless otherwise specified or dictated by the steps themselves. The present disclosure is intended to alternatives, modifications, or variances that fall within the scope of the appended claims.

The present disclosure is directed to network based resource management and allocation. It is to be appreciated that network based resource management and allocation is described herein more fully with reference to the accompanying drawings. The illustrated examples described herein are exemplary of network based resource management and allocation, which can be embodied in various forms. Therefore, it is to be understood that any structural and functional details disclosed herein as a basis for the claims and for teaching one skilled in the art to variously employ the present invention. Furthermore, the terms and phrases used herein merely provide an understandable description of the invention.

The use of the singular forms "a", "an," and "the" include plural referents unless the context dictates otherwise. Thus, for example, reference to "a stimulus" includes a plurality of such stimuli and reference to "the signal" includes reference to one or more signals and equivalents thereof, and so forth.

It is to be appreciated that certain examples as discussed herein are a software algorithm, program or code residing on computer useable medium having control logic for enabling execution on a machine having a computer processor. A computer useable medium as discussed herein is not and should not be construed to be a signal. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The examples described herein include such software to implement the equations, relationships and algorithms described above. Although at least one series of steps are presented as an exemplary method of practicing one or more examples described herein, it will be appreciated that the steps identified may be practiced in any order that is practicable, including without limitation the omission of one or more steps.

Examples of mobile devices that may be utilized include but are not limited to mobile devices, such as a multifunction "smart phones", wearables (e.g., smart watch, smart glasses) personal computers, notebook computers, tablet computers, or server devices. It should be understood that devices each generally include at least one processor, at least one data interface, and at least one memory device coupled via buses. Devices may be capable of being coupled together, coupled to peripheral devices, and input/output devices. Each device may be combined with other devices in a distributed processing environment or divided into subcomponents.

The terms "comprises" or "comprising" are to be interpreted as specifying the presence of the stated features, integers, steps or components, but not precluding the presence of one or more other features, integers, steps or components or groups thereof.

Although the systems and methods for network based resource management and allocation have been described with respect to the examples disclosed herein, those skilled in the art will readily appreciate that changes and modifications may be made thereto without departing from the spirit and scope of the subject invention.

What is claimed is:

1. A device comprising:
    a processor; and
    a memory coupled with the processor, the memory having stored thereon executable instructions that when executed by the processor cause the processor to effectuate operations comprising:
        receiving information associated with an action of a mobile device;
        responsive to receiving the information associated with the action of the mobile device, determining an anticipated transaction associated with a user profile;
        ascribing the anticipated transaction to a first allocation of a plurality of allocations of a resource; and
        determining a projected remaining balance of the first allocation of the resource based on if the anticipated transaction occurs.

2. The device of claim 1, wherein the resource comprises a memory resource.

3. The device of claim 1, wherein the resource comprises a battery power resource.

4. The device of claim 1, wherein the information associated with the action of the mobile device comprises a location of the mobile device.

5. The device of claim 1, wherein the determining of the anticipated transaction associated with the user profile is based on the mobile device being within a geo-fence.

6. The device of claim 1, further operations comprising providing instruction to send an alert to the mobile device comprising the projected remaining balance.

7. The device of claim 1, wherein the resource comprises a monetary resource.

8. A method comprising:
    receiving information associated with an action of a mobile device;
    responsive to receiving the information associated with the action of the mobile device, determining an anticipated transaction associated with a user profile;
    ascribing the anticipated transaction to a first allocation of a plurality of allocations of a resource; and
    determining a projected remaining balance of the first allocation of the resource based on if the anticipated transaction occurs.

9. The method of claim 8, wherein the resource comprises a memory resource.

10. The method of claim 8, wherein the resource comprises a battery power resource.

11. The method of claim 8, wherein the information associated with the action of the mobile device comprises a location of the mobile device.

12. The method of claim 8, wherein the determining of the anticipated transaction associated with the user profile is based on the mobile device being within a geo-fence.

13. The method of claim 8, further operations comprising providing instruction to send an alert to the mobile device comprising the projected remaining balance.

14. The method of claim 8, wherein the resource comprises a monetary resource.

15. A computer readable storage medium comprising computer executable instructions that when executed by a computing device cause said computing device to effectuate operations comprising:
    receiving information associated with an action of a mobile device;
        responsive to receiving the information associated with the action of the mobile device, determining an anticipated transaction associated with a user profile;
        ascribing the anticipated transaction to a first allocation of a plurality of allocations of a resource; and
        determining a projected remaining balance of the first allocation of the resource based on if the anticipated transaction occurs.

16. The computer readable storage medium of claim 15, wherein the anticipated transaction comprises use of an application.

17. The computer readable storage medium of claim 15, wherein the anticipated transaction comprises purchase of an item.

18. The computer readable storage medium of claim 15, wherein the information associated with the action of the mobile device comprises a location of the mobile device.

19. The computer readable storage medium of claim 15, wherein the determining of the anticipated transaction associated with the user profile is based on the mobile device being within a geo-fence.

20. The computer readable storage medium of claim 15, wherein the resource comprises a monetary resource.

* * * * *